United States Patent
Chen et al.

(10) Patent No.: US 6,351,289 B1
(45) Date of Patent: Feb. 26, 2002

(54) METHOD AND APPARATUS THAT GENERATES VBI DATA CODING WAVEFORMS

(75) Inventors: An-Tung Chen, Taoyuan; Hsin-Mei Chen; Jong Ping Lee, both of Hsinchu, all of (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/198,859

(22) Filed: Nov. 24, 1998

(51) Int. Cl.[7] .................. H04N 7/00; H04N 7/08; H04N 7/084; H04N 7/087; H04N 11/00
(52) U.S. Cl. .............. 348/478; 348/461; 348/468; 348/473; 348/477; 348/505; 348/479
(58) Field of Search ................. 348/464, 470, 348/473, 476, 477, 505, 461, 467, 468, 478, 479; H04N 7/00, 7/08, 7/084, 7/087, 11/00

(56) References Cited

U.S. PATENT DOCUMENTS

| | | | |
|---|---|---|---|
| 5,448,299 A | * 9/1995 | Yang et al. ............... 348/475 |
| 5,786,865 A | * 7/1998 | Ayzenberg et al. ......... 348/505 |
| 5,822,011 A | * 10/1998 | Rumreich ................... 348/549 |
| 5,838,832 A | * 11/1998 | Barnsley ..................... 382/249 |
| 5,844,615 A | * 12/1998 | Nuber et al. ................ 348/478 |
| 5,896,180 A | * 4/1999 | Usui .......................... 348/547 |
| 5,907,366 A | * 5/1999 | Farmer et al. .............. 348/478 |
| 6,005,632 A | * 12/1999 | Cahill, III ................... 348/465 |
| 6,067,122 A | * 5/2000 | Cahill, III ................... 348/478 |
| 6,072,532 A | * 6/2000 | Chich et al. ................ 348/478 |
| 6,094,228 A | * 7/2000 | Ciardullo et al. ........... 348/473 |
| 6,104,858 A | * 8/2000 | Suzuki ........................ 386/65 |
| 6,122,010 A | * 9/2000 | Emelko ...................... 348/461 |
| 6,160,587 A | * 12/2000 | Walker et al. .............. 348/478 |

\* cited by examiner

*Primary Examiner*—Reinhard J. Eisenzopf
*Assistant Examiner*—Brian P. Yenke
(74) *Attorney, Agent, or Firm*—Raymond Sun

(57) ABSTRACT

An apparatus and method is provided for generating VBI data coding waveforms. The present invention utilizes a single look-up table that stores sampled values of sine waves in direct waveform synthesis for both color burst processing and VBI data coding processing. Furthermore, the present invention utilizes a 2T pulse as a signalling waveform in direct synthesis to overcome the problem of overlap for conventional unit pulse durations.

15 Claims, 5 Drawing Sheets

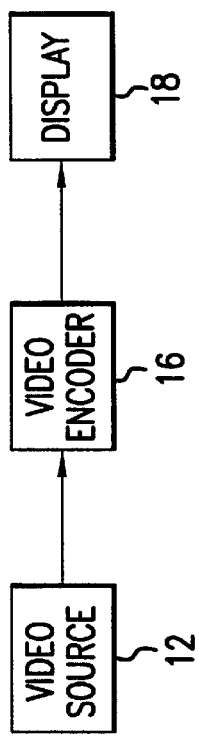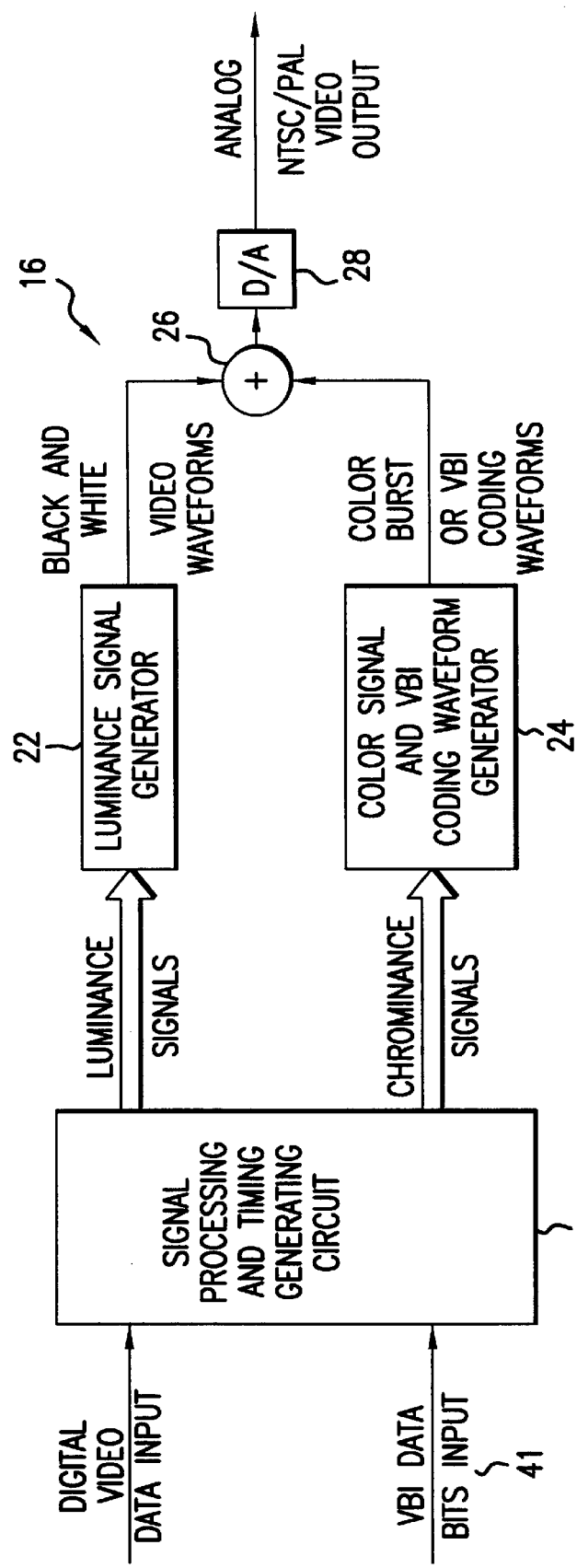

METHOD AND APPARATUS THAT GENERATES VBI DATA CODING WAVEFORMS

BACKGROUND OF THE INVENTION

1. Field of the Invention

The present invention relates generally to video encoders, and in particular, to an apparatus for generating VBI data coding waveforms.

2. Background Art

An important component in a video play-back system is a video encoder. The design of a video encoder is a complex endeavor that requires careful consideration of different data transmission requirements and data waveform characteristics. Typically, a video encoder should be able to handle two common color television standards: National Television Standards Committee (NTSC) and Phase Alternating Line (PAL). In addition, the video encoder should be able to handle Vertical Blanking Interval (VBI) data encoding for applications such as close-captioned programming and teletext data transmission. The NTSC, PAL, and VBI data encoding schemes are described in greater detail hereinafter.

Unfortunately, the data transmission requirements, methods, and data waveform characteristics for VBI data encoding schemes are different from the data requirements, methods, and data waveform characteristics for NTSC and PAL standards, leading to increased complexity and cost in the design and implementation of video encoders.

An important component in VBI data encoders is the waveform shaping circuit. Conventional waveform shaping circuits use a digital filter and a baud rate synchronizer that is driven by a system clock. Unfortunately, this conventional approach to waveform shaping is difficult to apply to VBI data codings because (1) baud rate types are numerous, and (2) the system clock has limitations.

An alternative approach is to utilize direct waveform synthesis for waveform shaping. Unfortunately, in order to satisfy bandlimit and minimum inter-symbol interference (ISI) requirements, a unit pulse (e.g., a raised cosine pulse with 4T duration) is utilized by the conventional approach. This unit pulse requires very large look-up tables for the direct synthesis of the waveforms. In addition, even with a large look-up table, further computations are needed after values are read from the table to account for the overlap of the unit pulse waveform.

In summary, conventional video encoders suffer from the following disadvantages. First, separate circuits are needed to convert a digital video stream into a standard NTSC or PAL signal, and additional circuits are needed to handle the VBI data transmission requirements, thereby increasing circuit complexity and cost. Second, conventional VBI data encoders require a very large look-up table for waveform synthesis to reduce inter-symbol interference (ISI) to acceptable levels. Since space is at a premium, the large area needed by the look-up table is undesirable. Third, with a large look-up table, additional circuits are needed for computations, such as addition and multiplication, to account for the overlap of the waveforms.

Accordingly, there remains a need for a method and apparatus for generating VBI data coding waveforms that overcomes the disadvantages set forth previously.

SUMMARY OF THE INVENTION

It is an object of the present invention to provide a method and apparatus for generating VBI data coding waveforms that reduce inter-symbol interference (ISI).

It is another object of the present invention to provide a method and apparatus for generating VBI data coding waveforms that reduce the size of the waveform look-up table.

It is another object of the present invention to provide a method and apparatus for generating VBI data coding waveforms that obviates the need for further computations after the values are read from the look-up table.

It is yet another object of the present invention to provide a method and apparatus for generating VBI data coding waveforms that utilizes the waveform look-up table associated with color burst processing to generate VBI data coding waveforms.

In order to accomplish the objects of the present invention, an apparatus and method for generating VBI data coding waveforms are provided. The present invention utilizes a single look-up table that stores sampled values of sine waves in direct waveform synthesis for both color burst processing and VBI data coding processing. Furthermore, the present invention utilizes a 2T duration pulse as a signalling waveform in direct synthesis to overcome the problem of overlap for conventional unit pulse durations.

The apparatus and method for generating VBI data coding waveforms according to the present invention includes a VBI coding waveform generating circuit that is provided in a video encoder for generating VBI data coding waveforms and color burst waveforms. This circuit has a first selection circuit that selects either a color burst phase data signal or a VBI phase data signal as an address for a waveform look-up table based on a color burst period signal. A second selection circuit is provided for receiving a color burst scalar signal, a VBI scalar signal, and the color burst period signal, and for generating either the color burst scalar signal or the VBI scalar signal based on the color burst period signal. The waveform look-up table is coupled to the first selection circuit and receives the address and generates a point of the waveform corresponding to the address. A multiplier is coupled to the waveform look-up table and the second selection circuit and multiplies the output of the waveform look-up table with the output of the second selection circuit and to obtain a scaled output.

In an alternative embodiment, a simplification circuit for reducing the size of the waveform look-up table is coupled to the look-up table and the multiplier. The simplification circuit includes a sign determination circuit, coupled to the look-up table and the multiplier, for receiving a value from the look-up table and for multiplying the value with either a one or a negative one based on a sign control signal. The simplification circuit further includes a third selection circuit, coupled to the sign determination circuit, for receiving a color burst sign control signal, a VBI sign control signal, and a color burst period signal, and for generating either the color burst sign control signal or the VBI sign control signal based on the color burst period signal.

BRIEF DESCRIPTION OF THE DRAWINGS

FIG. 1 illustrates a system in which the VBI data coding waveform generation circuit of the present invention can be implemented.

FIG. 2 is a simplified block diagram of the video encoder of FIG. 1.

DETAILED DESCRIPTION OF THE INVENTION

Figure 3:
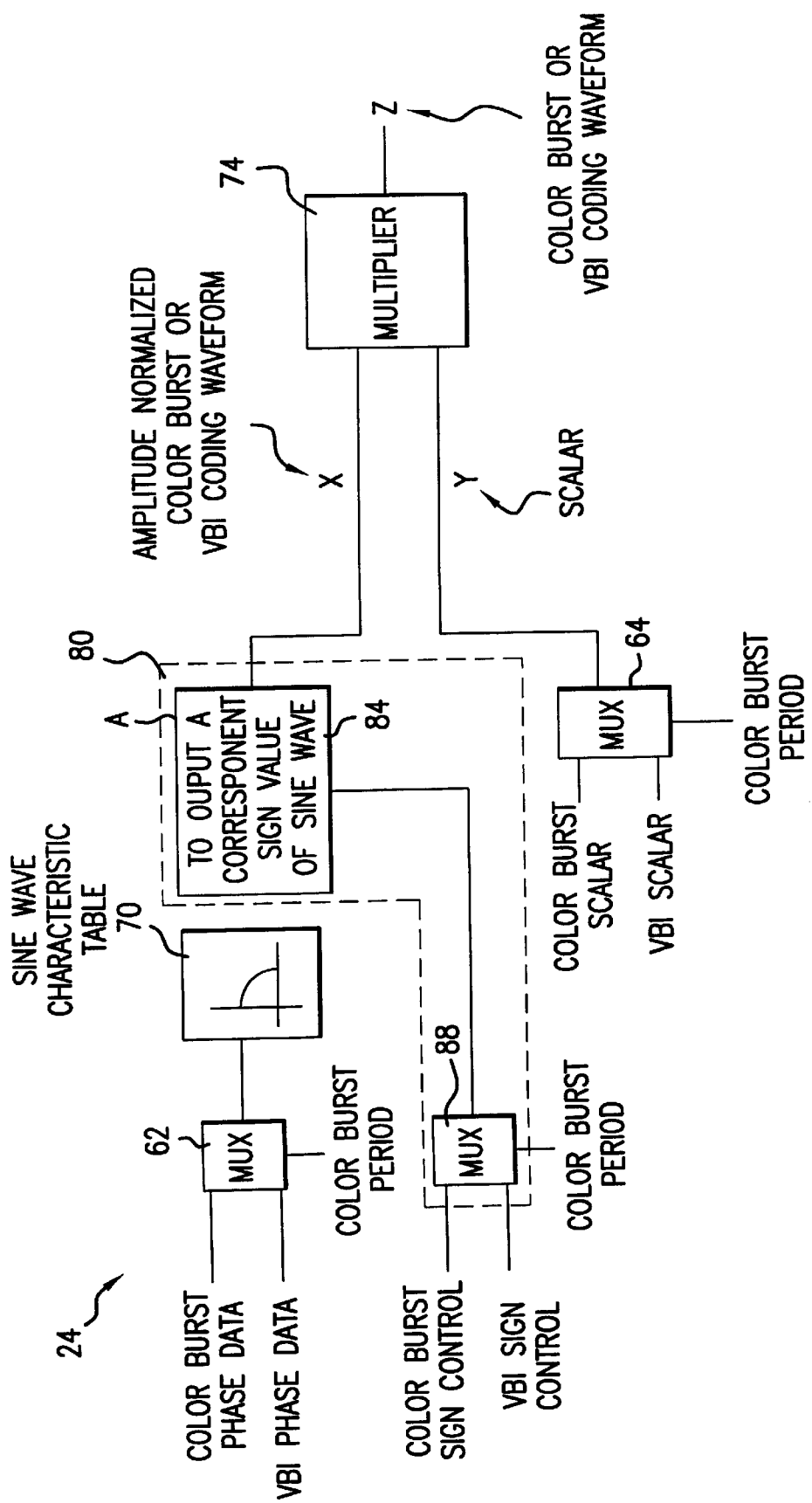
FIG. 3 illustrates a block diagram of a VBI data coding waveform generation circuit configured in accordance with one embodiment of the present invention.

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known or conventional data processing techniques, hardware devices and circuits are omitted so as to not obscure the description of the present invention with unnecessary detail.

The apparatus and method for generating VBI data coding waveforms of the present invention utilizes the following novel aspects: (1) utilizing a 2T pulse as a unit pulse to eliminate inter-symbol interference (ISI); (2) utilizing a video encoder color subcarrier generation circuit to generate the VBI data coding waveform (i.e., an integrated architecture that provides direct waveform synthesis for both color burst and VBI data coding); (3) utilizing a single look-up table that stores sampled values of sine waves in direct waveform synthesis for both color burst processing and VBI data coding processing; and (4) optionally utilizing a simplification circuit to further reduce the size of the look-up table that stores the sampled values of the sine waves.

FIG. 1 illustrates a system 10 in which the VBI data coding waveform generation circuit 24 of the present invention can be implemented. System 10 includes a video source 12 for providing video images, a video encoder 16 coupled to the video source 12, and a display 18 coupled to the video encoder 16 for playing back the video signals. Video source 12 can be a digital video source, such as a digital video camera, a digital video disc (DVD) player, a personal computer (PC), a cable box or other reception unit that provides digital video signals. Display 18 can be a television (TV), or other display device.

Video encoder 16 provides an interface between video source 12 and display 18 by receiving signals that are digital in form from the video source 12 and converting these digital signals into a composite analog signal that is usable by display 18. These digital signals can include digital video data input and VBI data bits input 41 that are provided to a signal processing and timing generating circuit 20 in the video encoder (as described below). These digital signals can be in the form of a Y, Cr, and Cb color format. Y is the luminance; Cr and Cb are two color difference signals. Video encoder 16 converts the Y, Cr, Cb digital signals into a composite video signal having a predefined format that display 18 can recognize and use. These predefined formats include the NTSC format and the PAL format.

The NTSC format is well known in the art and utilizes 30 frames/sec, 2 field/frames (also referred to as interlace), and 262.5 lines per field or 525 lines per frame. The NTSC format uses a color format that is based on the Y, Cr, Cb color format. The PAL format is also well known in the art and utilizes 25 frames/sec, 2 field/frames (also referred to as interlace), and 312.5 lines per field or 625 lines per frame. The PAL format also uses a color format that is based on the Y, Cr, Cb color format, but is different from the color format for the NTSC format.

Regardless of the video format, each field includes a vertical blanking interval (hereinafter referred to as VBI) to signal the start of a field. The VBI includes several lines, usually the top few lines, on which no picture information is transmitted. The VBI can be used to transmit other information, such as vertical interval time code (VITC) or vertical interval test signal (VITS) to the display 18. The VBI can also be used for data encoding. An example of VBI data encoding is closed-captioned programs (e.g., TV broadcasts or video tapes). A portion of the VBI is used to notify the display 18 what caption to display and how to display the caption. Another example of using VBI for data encoding is teletext. A portion of the VBI is used to deliver public information to viewers of display 18.

Some examples of well-known VBI data encoding include: (1) closed-caption encoding (Electronic Industries Association (EIA) 608); (2) Widescreen Signaling/Copy Generation Management System (WSS/CGMS) encoding: ITU-R BT.1119 (for PAL) and EIAJ CPX-1204 (for NTSC); (3) teletext encoding: ITU-R BT.653 System B and System C.

To implement these VBI data encoding schemes, the following requirements need to be met: (1) a specified baud rate, and (2) the signaling waveform needs to have a very small inter-symbol interference (ISI), and (3) the bandwidth needs to be limited to the video bandwidth.

The baud rate required for the different data encoding schemes are as follows:

| | |
|---|---|
| NTSC closed caption | 503.4965 kHz |
| PAL closed caption | 500 kHz |
| NTSC WSS | 447.443 kHz |
| PAL WSS | 5 MHz |
| NTSC Teletext | 5.727272 MHz |
| PAL Teletext | 6.9375 MHz |

Figure 4:
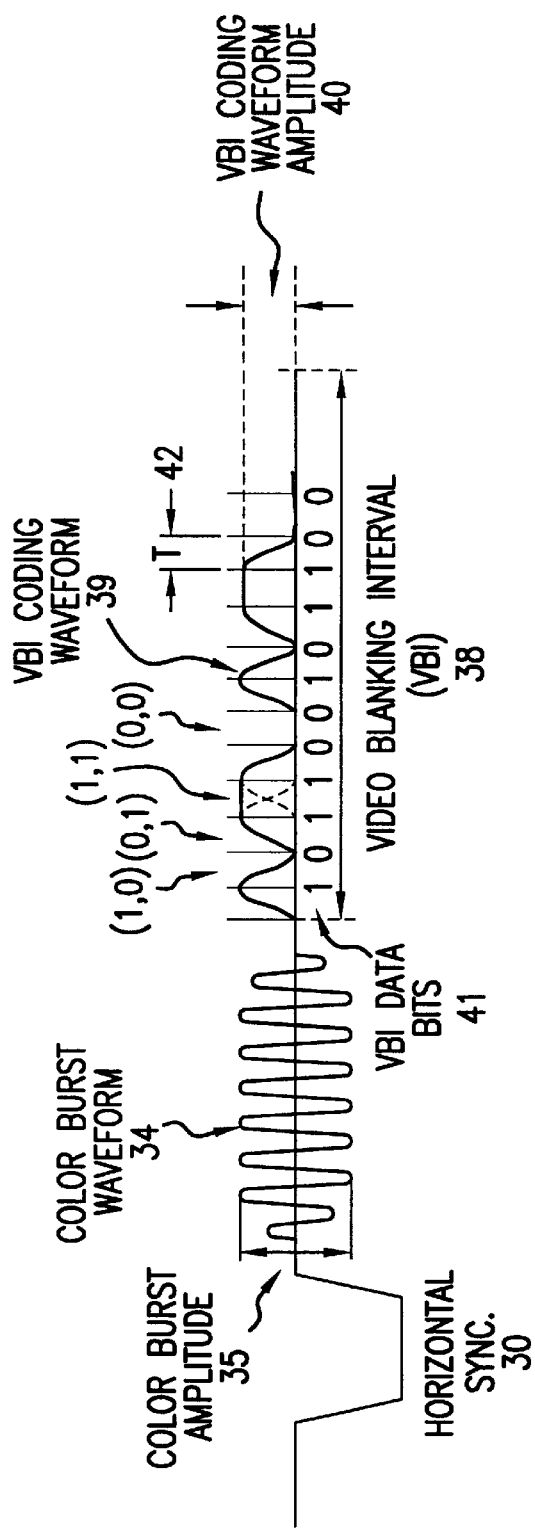
FIG. 4 illustrates a VBI encoded horizontal line in a video encoder.

FIG. 4 illustrates a VBI encoded horizontal line in a video encoder. The horizontal line includes a horizontal synchronization portion 30, a color burst waveform 34, and a video blanking interval (VBI) 38. Color burst waveform 34 has a color burst amplitude 35. The VBI 38 includes a VBI coding waveform 39 that has an amplitude 40. VBI coding waveform 39 corresponds to the VBI data bits 41 that are provided either from the video source 12, or input manually by a user.

"T" 42 is the symbol duration or bit interval. It is noted that T as used herein does not refer to the conventional use of "T" in TV terminology. In conventional TV terminology, "T" equals 125 ns for a NTSC system and equals 100 ns for a PAL system. In contrast, in the present invention, T is equal to the symbol duration (or bit interval) of the VBI coding. The symbol duration or bit interval can vary depending on the different VBI standards. FIG. 4 also illustrates the four possible VBI data bit transitions (1,0), (0,1), (1,1) and (0,0) which are described in greater detail hereinafter with reference to FIGS. 6A–6D and 7.

The horizontal synchronization portion 30 signifies the start of a horizontal line that can precede the color burst portion 34. Depending on the protocol, the VBI utilizes a predetermined number of lines out of the VBI and specific lines of the VBI for data coding.

The color burst portion 34 has a sinewave-shaped waveform (hereinafter referred to as the color burst sine wave 34).

The color burst portion 34 is a carrier signal for phase modulation of chrominance. The video encoder 16 generates the color burst sine wave 34 and provides the color burst sine wave 34 to display 18 to allow the display 18 to demodulate the color or chrominance signals.

FIG. 2 is a simplified block diagram of the video encoder 16. The video encoder 16 has a signal processing and timing generating circuit 20 that receives the digital video data from the video source 12 and the VBI data bits 41 from the video source 12. The VBI data bits 41 can also be input manually by a user. Circuit 20 processes the received signals, and then provides luminance signals to a luminance signal generator 22, and provides chrominance signals to the color signal and VBI coding waveform generator 24 (also referred to as "VBI data coding waveform generation circuit 24"), which is described in connection with FIG. 3 below. Luminance signal generator 22 is well-known in the art, and shall not be described in greater detail. Luminance signal generator 22 provides black and white video waveforms to an adder 26, and VBI data coding waveform generation circuit 24 provides an output Z (either the amplitude scaled color burst waveform or the amplitude scaled VBI waveform, as described below) to an adder 26. The adder 26 sums these inputs and then provides the resulting waveform (which is a digital NTSC or PAL video output) to a digital-to-analog (DA) converter 28 which converts the digital waveform into an analog NTSC or PAL video output that can be recognized by the display 18.

FIG. 3 illustrates a block diagram of the VBI data coding waveform generation circuit 24 configured in accordance with one embodiment of the present invention. The VBI data coding waveform generation circuit 24 receives the chrominance signals from the circuit 20, which include the following: color burst phase data, VBI phase data, color burst sign control, VBI sign control, color burst period, color burst scalar and VBI scalar. The VBI data coding waveform generation circuit 24 includes a first selection circuit 62 for receiving a color burst phase data signal, a VBI phase data signal, and a color burst period signal. Based on these inputs, first selection circuit 62 generates an address. In one embodiment, the color burst phase data signal and the VBI phase data signal can each be eight bits wide, and the color burst period signal can be a single bit.

The VBI data coding waveform generation circuit 24 also includes a second selection circuit 64 for receiving a color burst scalar signal, a VBI scalar signal, and a color burst period signal. Second selection circuit 64 generates either the color burst scalar signal or the VBI scalar signal based on the color burst period signal. In one embodiment, the color burst phase data signal, the VBI phase data signal, color burst scalar signal and the VBI scalar signal can each be 8 bits wide.

A sine wave characteristic table 70 (hereinafter referred to as a "waveform look-up table" or simply "look-up table") is coupled to receive the address from the first selection circuit 62. Based on the address, the look-up table 70, which can be the color sub-carrier look-up table, provides a value or point of a waveform corresponding to the address. Table 70 can store samples of an amplitude normalized sine wave, which needs to be scaled. A multiplier 74 is coupled to the look-up table 70 and the second selection circuit 64 for receiving the output of the look-up table 70 (X) and the output of the second selection circuit 64 (Y). The output of the look-up table 70 (X) is the amplitude normalized color burst or VBI coding waveform provided by look-up table 70. The output of the second selection circuit 64 (Y) is a scalar signal for either the color burst waveform or the VBI coding waveform.

Based on X and Y, the multiplier 74 generates Z, which is either the amplitude scaled color burst waveform or the amplitude scaled VBI waveform. In other words, multiplier 74 scales the waveform (X) received from look-up table 70 by multiplying X with scalar Y received from second selection circuit 64. The color burst waveform and the VBI waveform are both in digital form, and the color burst waveform is a sine wave.

In an alternative embodiment, VBI data coding waveform generation circuit 24 further includes a simplification circuit 80, interposed between look-up table 70 and multiplier 74, for reducing the size of look-up table 70. The simplification circuit 80 includes a sign determination circuit 84 that is coupled between look-up table 70 and multiplier 74. Sign determination circuit 84 receives a value from look-up table 70 and multiplies the value with either a one or a negative one based on a sign control signal. The simplification circuit 80 further includes a third selection circuit 88 for receiving a color burst sign control signal, a VBI sign control signal, and a color burst period signal and generating either the color burst sign control signal or the VBI sign control signal based on the color burst period signal. Third selection circuit 88 provides the sign signal to sign determination circuit 84.

The simplification circuit 80 allows the look-up table 70 to be reduced to one-fourth its size without the simplification circuit 80. In other words, only one-fourth of the values need to be stored in the look-up table 70 since the simplification circuit 80 determines which quadrant of the sine wave the value being accessed belongs to and appends the appropriate sign.

In one embodiment, each of the selection circuits 62, 64, 88 can be implemented with one or more 2-to-1 multiplexers that includes two data inputs, a control input, and an output. The control signal received by the control input determines which data input is provided by the output. In addition, the definitions for the signals in FIG. 3 are as follows:

The "color burst period signal" indicates when a color burst occurs. When the color burst period signal is asserted (i.e., a logic "1"), a color burst will appear. When the color burst period signal is de-asserted (i.e., a logic "0"), a VBI duration will appear.

The "color burst phase data signal" indicates the instantaneous phase (address for look-up table) of a color burst waveform. The "VBI phase data signal" indicates the instantaneous phase (address for look-up table) of a VBI coding waveform.

The "color burst scalar signal" controls the amplitude of the color burst waveform. The "VBI scalar signal" controls the amplitude of the VBI coding waveform.

The "color burst sign control signal" controls the sign of the value read from the look-up table for color burst waveform so that only a quarter of a sine wave needs to be stored. The "VBI sign control signal" controls the sign of the value read from the look-up table for VBI coding waveform so that only a quarter of a sine wave needs to be stored.

An important aspect of the video encoder 16 of the present invention is the use of a 2T pulse as a signalling waveform in direct synthesis. The 2T pulse according to present invention is a special pulse whose waveform equals:

$$\cos^2[(t/2T)pi] \text{ for } -T \leq t \leq T$$

Figure 5:
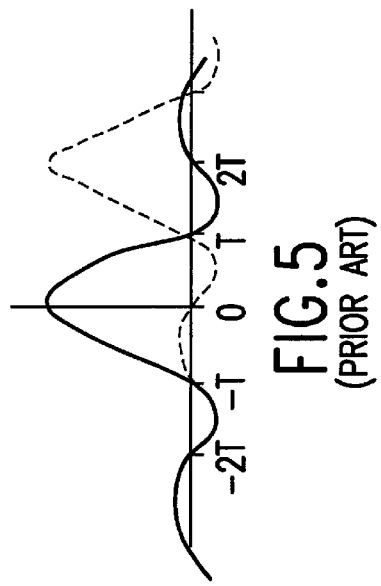
FIG. 5 illustrates the problem of overlap for conventional unit pulse durations.

FIG. 5 illustrates the problem of overlap for conventional unit pulse durations. As can be seen in FIG. 5, when a unit pulse of several T is utilized as in the prior art, the tails of the current waveform and the next waveform overlap, thereby causing interference. This overlap must be accounted for since the tails affect the overall value of the resulting summed waveform. For example, the resulting waveform in the region from −T to 0 has a component that is attributable to the left tail of the next waveform. Similarly, the resulting waveform in the region from 0 to T has a seemingly negative component that is attributable to the left tail of the next waveform. The prior art requires additional circuitry to account for and calculate the contribution to the resulting waveform from these tails.

In light of the above, the following benefits of using a 2T pulse can be seen. Most importantly, because a 2T pulse has a 2-bit interval, the inter-symbol overlap duration is T, and the waveform during this overlap duration can be determined by the front and rear bits of 2 consecutive VBI data bits.

FIGS. 6A–6D illustrate the four different cases of overlap when a 2T pulse waveform is used as the unit pulse in accordance to one embodiment of the present invention. The advantage of utilizing a 2T unit pulse is that there are only four possible cases or types: "00", "01", "10", and "11" illustrated in FIGS. 6A–6D, the resultant VBI coding waveform is the combination of all the waveforms corresponding to the "1" and "0"'s of the VBI data bits.

Figure 6A:
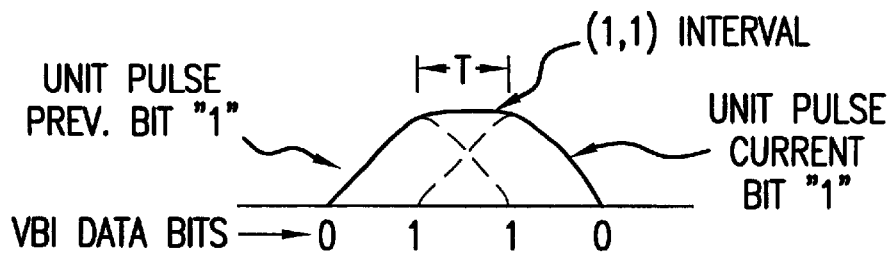
FIGS. 6A–6D illustrate the four different cases of overlap when a 2T pulse waveform is used as the unit pulse in accordance to one embodiment of the present invention.

FIG. 6A illustrates the case when the previous bit is "1" and the current bit is also "1". It is noted that the unit pulse for the previous bit "1" and the unit pulse for the current bit "1" sum to a "1" waveform in the overlap interval T. Specifically, the overlap is:

$$\cos^2[(t/2T)pi] + \cos^2[(1+T/2T)pi] = 1.$$

Figure 6B:
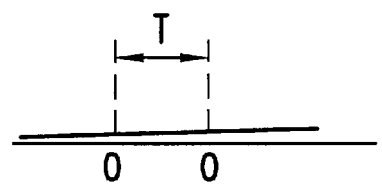

FIG. 6B illustrates the case when the previous bit is "0" and the current bit is also "0". It is noted that since the unit pulse for the previous bit "0" and the unit pulse for the current bit "0" are both a zero waveform, their sum is also a 0 waveform in the overlap interval T. Specifically, the overlap is 0+0=0.

Figure 6C:
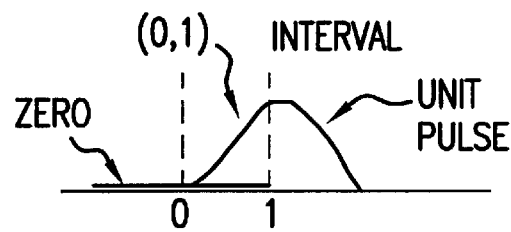

FIG. 6C illustrates the case when the previous bit is "0" and the current bit is "1". It is noted that the unit pulse for the previous bit "0" and the unit pulse for the current bit "1" sum to a waveform as shown in the overlap interval T. Specifically, the overlap is:

$$\cos^2[(t/2T)pi] + 0 = \tfrac{1}{2} + \tfrac{1}{2}\cos(t/T).$$

Figure 6D:
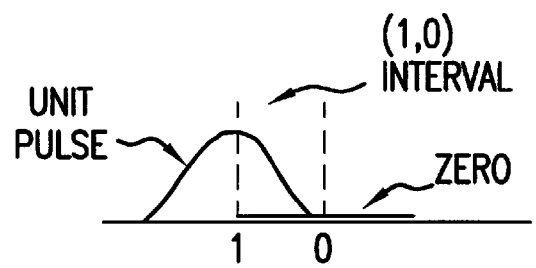

FIG. 6D illustrates the case when the previous bit is "1" and the current bit is "0". It is noted that the unit pulse for the previous bit "1" and the unit pulse for the current bit "0" sum to a waveform as shown in the overlap interval T. Specifically, the overlap is:

$$0 + \cos^2[(1+T/2T)pi] = \tfrac{1}{2} - \tfrac{1}{2}\cos(t/T).$$

Thus, when the data bits are "00", the resulting waveform (i.e., the summing of a current waveform and a previous waveform) is a 0 waveform. When the data bits are "11", the resulting waveform is a 1 waveform. The generation of the waveforms in these two cases is trivial since they are constants, so they can be generated by using values in the look-up table 70, or in an alternative embodiment, can even be generated by the signal processing and timing generating circuit 20 and provided directly to the adder 26, therefore bypassing the VBI data coding waveform generator 24. When the data bits are "01" or "10", the current waveform and previous waveform overlap, and the resulting waveform is a shifted sine wave that is generated by the VBI data coding waveform generator 24.

Figure 7:
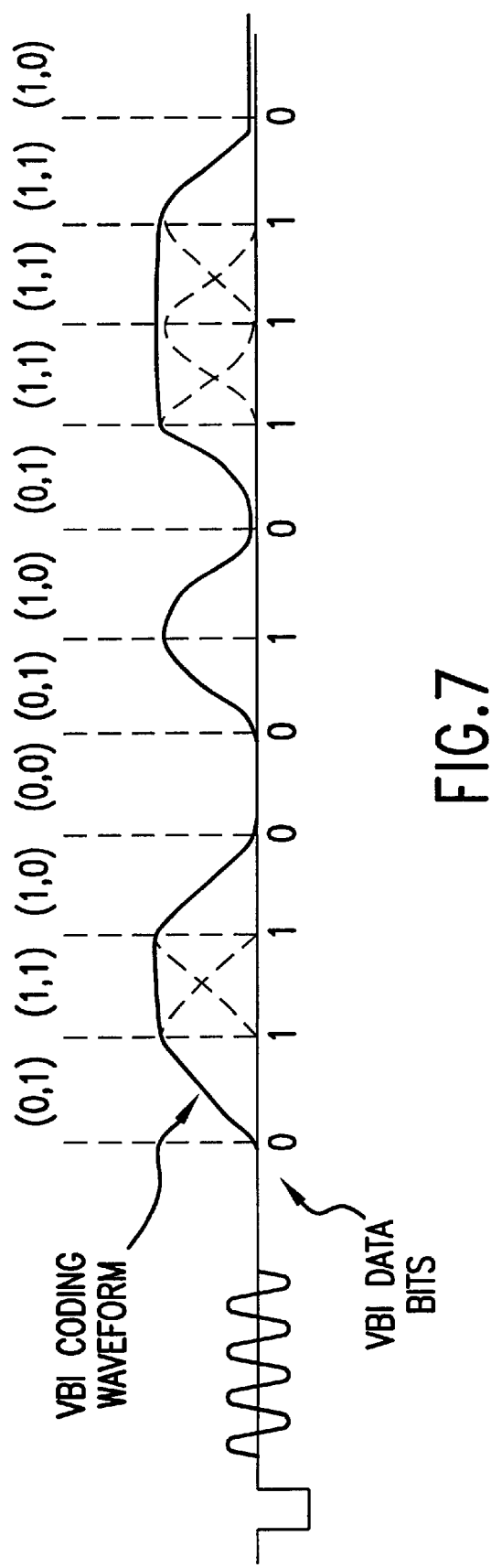
FIG. 7 illustrates an exemplary VBI coding waveform generated by the present invention.

FIG. 7 illustrates an exemplary VBI coding waveform generated by the present invention.

Accordingly, for waveform synthesis, the unit pulse waveform (the 2T pulse) can be sampled and stored in a look-up table. The inventors have discovered that the look-up table 70 for the color sub-carrier synthesis can be utilized for synthesizing the waveform since the color sub-carrier synthesis occurs at a different time than VBI data coding (see FIG. 2 and as described above), and both synthesis utilize sine waveforms. In particular, since the 2T pulse is equal to:

$$\cos^2(x) = 0.5[1 + \cos(2x)],$$

the color sub-carrier look-up table 70 can also be used to synthesize the waveform for VBI data coding.

The operation of the video encoder 16 of FIG. 2 is now described. In a first step, a 2T pulse signal is adapted as the unit pulse for all VBI coding waveforms, where T is the bit interval. A 2T pulse is a pulse having a duration of 2T. As explained above, the 2T pulse can be generated by squaring a half-cycle of a sine wave:

$$2T\ \text{pulse} = \cos^2[(t/2T)pi] \text{ for } -T \leq t \leq T.$$

In a second step, it is determined what the current and previous VBI data bits are. Thereafter, the look-up table 70 is utilized to provide a waveform based on the address, and can include the step of utilizing the color sub-carrier waveform look-up table 70 to provide a waveform for a duration of T based on VBI phase data.

In an alternative embodiment, if a current VBI data bit is "1", and the previous-VBI data bit is "1", then the output waveform can be provided by circuit 20, and is a value of "1" for a duration of T. Similarly, if a current VBI data bit is "0", and the current VBI data bit is "0", then the output waveform can be provided by circuit 20, and is a value of "0" for a duration of T. However, the look-up table 70 is still utilized to provide a waveform based on the address for the other two cases, where the current VBI data bit is different from the previous VBI data bit.

Thus, the present invention provides an integrated architecture that can be used to process both color burst waveform synthesis and VBI data coding waveform synthesis. In addition, a single look-up table 70 can be used for both color burst waveform synthesis and VBI data coding waveform synthesis. Further, by using a 2T pulse as a unit pulse waveform, the present invention advantageously eliminates the need to perform further computations to address the overlap of unit pulse waveforms. Therefore, the number of circuits in the video encoder 16 is reduced while saving cost and space.

Although certain components, subsystems, and blocks have been described above as including certain elements, it will be appreciated by those skilled in the art that such disclosures are non-limiting, and that different elements, or combinations thereof, can be provided for such components, subsystems, and blocks without departing from the spirit and scope of the present invention.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. An apparatus for generating VBI data coding waveforms and color burst waveforms comprising:

a first selection circuit for receiving a color burst data signal, a VBI data signal, and a color burst period signal, and generates an address based thereon;

a second selection circuit for receiving a color burst scalar signal, a VBI scalar signal, and the color burst period signal, and generating one of the color burst scalar signal and the VBI scalar signal based on the color burst period signal; and a waveform look-up table coupled to the first selection circuit for receiving the address and providing a waveform output corresponding to the address.

2. The apparatus of claim 1, further including a multiplier coupled to the waveform look-up table and the second selection circuit for receiving the output of the waveform look-up table and the output of the second selection circuit and for scaling the amplitude of the VBI coding waveform.

3. The apparatus of claim 1, further including a simplification circuit coupled to the look-up table and the multiplier for reducing the size of the waveform look-up table.

4. The apparatus of claim 3, wherein said simplification circuit includes:

a third selection circuit for receiving a color burst sign control signal, a VBI sign control signal, and the color burst period signal, and generating one of the color burst sign control signal and the VBI sign control signal as a sign signal based on the color burst period signal; and a sign determination circuit coupled to the look-up table and the multiplier for receiving a value from the look-up table and multiplying the value with either a one or a negative one based on the sign signal.

5. The apparatus of claim 1, wherein said waveform look-up table includes sampled values of a sine wave.

6. A video play-back system comprising:

(a) a video source for providing video information;

(b) a display for viewing the video information; and (c) a video encoder for generating VBI data coding waveforms and color burst waveforms, said video encoder including a waveform generator having:

(i) a first selection circuit for receiving a color burst data signal, a VBI data signal, and a color burst period signal, and generates an address based thereon;

(ii) a second selection circuit for receiving a color burst scalar signal, a VBI scalar signal, and the color burst period signal, and generating one of the color burst scalar signal and the VBI scalar signal based on the color burst period signal; and (iii) a waveform look-up table coupled to the first selection circuit for receiving the address and providing a waveform output corresponding to the address.

7. The system of claim 6, wherein the waveform generator further includes a multiplier coupled to the waveform look-up table and the second selection circuit for receiving the output of the waveform look-up table and the output of the second selection circuit and for scaling the amplitude of the VBI coding waveform to provide an output waveform.

8. The system of claim 6, further including a simplification circuit coupled to the look-up table and the multiplier for reducing the size of the waveform look-up table.

9. The system of claim 8 wherein the simplification circuit includes:

a third selection circuit for receiving a color burst sign control signal, a VBI sign control signal, and the color burst period signal, and generating one of the color burst sign control signal and the VBI sign control signal as a sign signal based on the color burst period signal; and a sign determination circuit coupled to the look-up table and the multiplier for receiving a value from the look-up table and multiplying the value with either a one or a negative one based on the sign signal.

10. The system of claim 6, wherein the waveform look-up table includes sampled values of a sine wave.

11. The system of claim 7, wherein the video encoder further includes:

a processor that receives video data representing the video information from the video source, and receives VBI data bits, and in response thereto provides chrominance signals to the waveform generator; and a digital to analog converter coupled to the waveform generator to receive the waveform output and to convert the output waveform into analog form.

12. The system of claim 11, wherein the processor generates luminance signals, and wherein the video encoder further includes:

a luminance signal generator coupled to the processor to receive luminance signals; and an adder having inputs coupled to the luminance signal generator and the waveform generator, and an output coupled to the digital to analog converter.

13. A method of shaping a waveform for VBI data coding comprising:

a. using a 2T pulse signal as a unit pulse, where T is a bit interval;

b. determining the current and previous VBI data bits from a stream of VBI data bits; and c. using a waveform look-up table to provide VBI coding waveform values for a duration of T based on VBI phase data, which includes:

if a current VBI data bit is one, and the previous VBI data bit is one, providing a one for a duration of T;

if a current VBI data bit is zero, and the previous VBI data bit is zero, providing a zero for a duration of T; and if a current VBI data bit is zero and the previous VBI data bit is one, or if a current VBI data bit is one and the previous VBI data bit is zero, then using the waveform look-up table to provide VBI coding waveform values for a duration of T based on VBI phase data.

14. A method of shaping a waveform in an encoder for VBI data coding comprising:

a. using a 2T pulse signal as a unit pulse, where T is a bit interval;

b. determining the current and previous VBI data bits from a stream of VBI data bits; and c. using a color sub-carrier waveform look-up table to provide VBI coding waveform values for a duration of T based on VBI phase data.

15. A method of shaping a waveform for VBI data coding comprising:

a. using a 2T pulse signal as a unit pulse, where T is a bit interval, the 2T pulse generated by squaring a half-cycle of a sine wave;

b. determining the current and previous VBI data bits from a stream of VBI data bits; and c. using a waveform look-up table to provide VBI coding waveform values for a duration of T based on VBI phase data;

wherein the 2T pulse is equal to $\cos^2[(t/2T)pi]$ for $-T \geq t \geq T$.

* * * * *